(12) United States Patent
Puppin et al.

(10) Patent No.: US 6,329,784 B1
(45) Date of Patent: Dec. 11, 2001

(54) STARTER CIRCUIT FOR MOTORS, PARTICULARLY FOR REFRIGERATOR COMPRESSORS

(75) Inventors: Ezio Puppin, Brugherio; Ermanno Pinotti, Bergamo, both of (IT)

(73) Assignee: Minu S.p.A., Busnago (IT)

( * ) Notice: Subject to any disclaimer, the term of this patent is extended or adjusted under 35 U.S.C. 154(b) by 0 days.

(21) Appl. No.: 09/526,508

(22) Filed: Mar. 16, 2000

(30) Foreign Application Priority Data

Apr. 16, 1999 (IT) .............................................. MI99A0804

(51) Int. Cl.[7] ........................................................ H02P 1/26
(52) U.S. Cl. ............................................. 318/778; 318/786
(58) Field of Search .................................... 318/774, 778, 318/779, 786, 798

(56) References Cited

U.S. PATENT DOCUMENTS

| | | | | |
|---|---|---|---|---|
| 3,742,370 | * | 6/1973 | Hansen | 318/227 |
| 3,832,612 | * | 8/1974 | Woods | 318/221 E |
| 3,859,591 | * | 1/1975 | Saunders | 323/18 |
| 4,422,030 | * | 12/1983 | McAllise | 318/779 |
| 4,481,786 | * | 11/1984 | Bushark | 62/160 |
| 4,486,700 | * | 12/1984 | Kawate et al. | 318/781 |
| 4,658,195 | * | 4/1987 | Min | 318/786 |
| 4,761,601 | * | 8/1988 | Zaderej | 318/786 |
| 4,801,858 | | 1/1989 | Min Young K | 318/786 |
| 4,912,390 | * | 3/1990 | Curran, Jr. et al. | 318/812 |
| 5,041,771 | * | 8/1991 | Min | 318/786 |
| 5,051,681 | * | 9/1991 | Schwarz | 318/786 |
| 5,268,623 | * | 12/1993 | Muller | 318/434 |
| 5,350,992 | * | 9/1994 | Colter | 318/807 |
| 5,589,753 | | 12/1996 | Kadah et al. | 318/785 |

FOREIGN PATENT DOCUMENTS

| | | |
|---|---|---|
| 0 571 956 | 12/1993 | (EP) . |
| 2 456 423 | 12/1980 | (FR) . |
| 2 000 650 | 9/1993 | (RU) . |

OTHER PUBLICATIONS

Patents Abstracts of Japan vol. 1995, No. 08, Sep. 29, 1995 & JP 07 123759 A (Yamada Denki Seizo KK), May 12, 1995 *abstract*.

* cited by examiner

*Primary Examiner*—Robert E. Nappi
*Assistant Examiner*—Rina I. Duda
(74) *Attorney, Agent, or Firm*—Guido Modiano; Albert Josif; Daniel O'Byrne

(57) ABSTRACT

A motor starter circuit, particularly for a motor of refrigerator compressors, comprising means for generating time-decreasing pulses adapted to drive switching means which are connected to the motor to be started, the means for generating time-decreasing pulses being AC-powered.

18 Claims, 4 Drawing Sheets

STARTER CIRCUIT FOR MOTORS, PARTICULARLY FOR REFRIGERATOR COMPRESSORS

BACKGROUND OF THE INVENTION

The present invention relates to a starter circuit for motors, particularly for refrigerator compressors. More particularly, the invention relates to a starter circuit for asynchronous motors, particularly but not exclusively adapted for motors of refrigerator compressors, both for industrial and household applications.

It is known that in a refrigerator the compressor is activated periodically so as to pump the coolant in the coils of the refrigerator.

This activation of the compressor occurs when the internal temperature of the refrigerator rises above a preset threshold. Accordingly, a heat-sensitive element detects the internal temperature of the refrigerator, and when said temperature rises above the set threshold it sends an activation signal to a compressor starter circuit. The starter circuit comprises a starter is and a protector for the motor of the compressor.

The starter is constituted by a heat-sensitive element in which the flow of current produces a temperature increase which causes the element to behave like a resistor having a very high value. Since such resistor is arranged in series to the motor, the temperature increase prevents the flow of current through the heat-sensitive element in order to reach the starter winding of the motor of the compressor.

However, although the heat-sensitive element is effective from the point of view of the intermittent activation of the single-phase asynchronous motor of the compressor, it entails a continuous, albeit modest, power consumption throughout the period during which the motor is running.

SUMMARY OF THE INVENTION

The aim of the present invention is to provide a motor starter circuit, particularly for refrigerator compressors, in which the circuit does not consume power except during the motor activation period, and even then consumes a very small amount of power.

Within the scope of this aim, an object of the present invention is to provide a motor starter circuit, particularly for refrigerator compressors, which is supplied with AC current.

A further object of the present invention is to provide a motor starter circuit, particularly for refrigerator compressors, which can be adapted for different kinds of compressor.

A further object of the present invention is to provide a motor starter circuit, particularly for refrigerator compressors, in which the motor is switched on for a preset time and the restarting time after power-off can be adjusted by selecting appropriate dimensions for the circuit.

Another object of the present invention is to provide a motor starter circuit, particularly for motors of refrigerator compressors, which is highly reliable, relatively easy to manufacture and at competitive costs.

This aim, these objects and others which will become apparent hereinafter are achieved by a motor starter circuit, particularly for a motor of refrigerator compressors, characterized in that it comprises means for generating time-decreasing pulses adapted to drive switching means which are connected to the motor to be started, said means for generating time-decreasing pulses being AC-powered.

BRIEF DESCRIPTION OF THE DRAWINGS

Further characteristics and advantages of the present invention will become apparent from the following detailed description of preferred but not exclusive embodiments of the circuit according to the invention, illustrated only by way of non-limitative example in the accompanying drawings, wherein.

DESCRIPTION OF THE PREFERRED EMBODIMENTS

Figure 1:
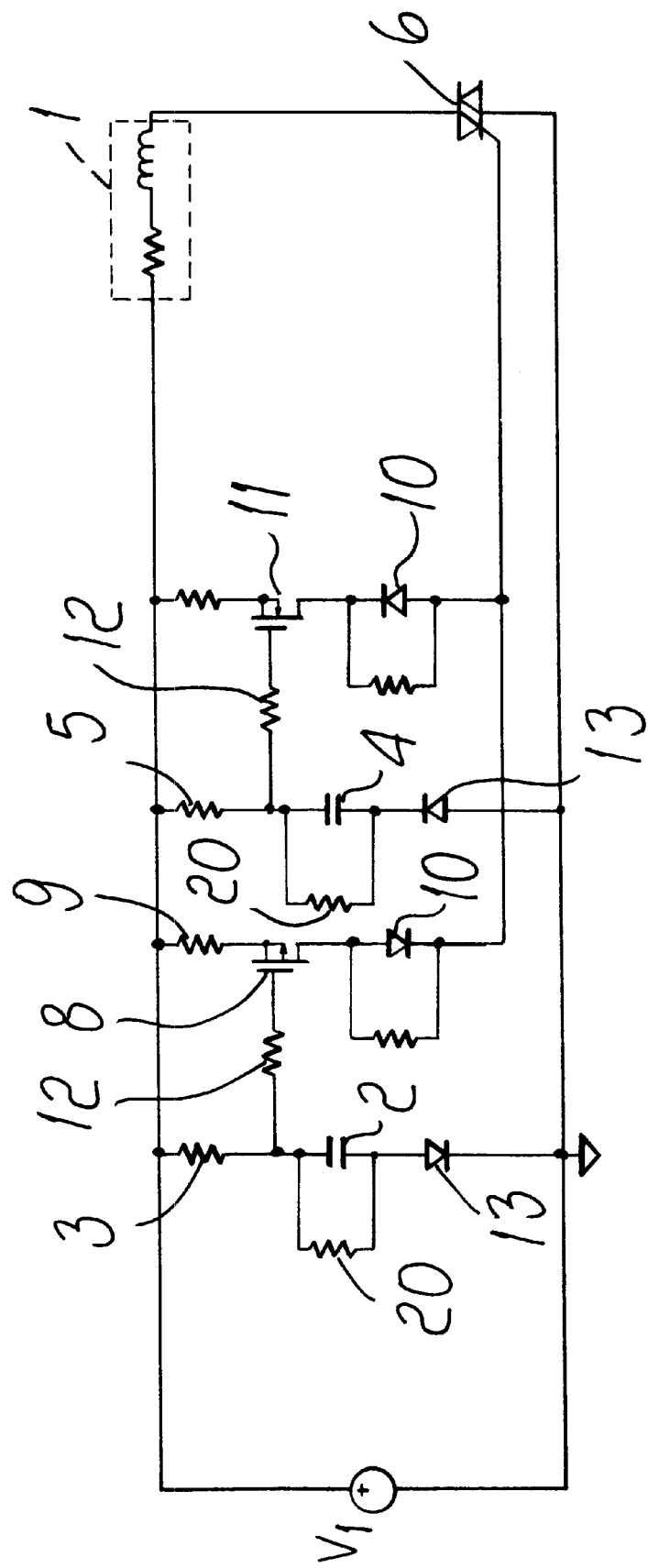
FIG. 1 is a circuit diagram of a first embodiment of the circuit according to the present invention.

With reference to the above figures, the AC-powered circuit according to the present invention comprises, in a first embodiment shown in FIG. 1, means for generating pulses which decrease over time and are adapted to drive at least one switch meant to close the circuit for supplying power to a motor 1. In particular, said motor can be a motor for driving a compressor for a refrigerator.

Conveniently, in the first embodiment the decreasing pulse generation means comprise a first circuit branch and a second circuit branch which are arranged in a parallel configuration with respect to each other; each branch comprises a resistor, a capacitor and a diode, designated by the reference is numerals 2, 3 and 13 for the first circuit branch and by the reference numerals 4, 5 and 13 for the second circuit branch, respectively.

At the terminals of the first and second circuit branches there is a source of a supply voltage V1, which can be provided for example by the electric mains.

Each one of the first and second circuit branches is adapted to drive amplifier means, which respectively drive switching means, which are conveniently provided for example by means of a triac or of an SCR and are generally designated by the reference numeral 6.

The switching means 6 therefore close the circuit with the motor 1 to be started.

FIG. 1 shows that the amplifier means related to the first and second circuit branches are respectively constituted by a p-channel MOS transistor 8, which is interposed between a resistor 9 and a diode 10.

The cathode of the diode 10 is common-connected to the anode of the diode 10 of the second circuit branch and both are connected to the gate input of the triac 6 (in this case the use of a triac is shown for the sake of simplicity, but the previous remarks on the use of alternative switching means are of course still valid).

The second circuit branch instead has an n-channel MOS transistor 11 which is again interposed between a resistor 9 and a diode 10.

The MOS transistors 8 and 11 have a resistor 12 for limiting the current in input to their gate terminal for protection purposes.

Finally, the first and second circuit branches are also provided with the diodes 13 arranged in series with respect to the capacitors 2 and 4 so that the cathode of the diode 13 of the first circuit branch is common-connected to the anode of the diode 13 of the second circuit branch.

The two circuit branches are therefore devised so that one allows the positive half-waves of the AC power supply to pass and the other one allows the negative half-waves to pass.

The operation of the circuit shown in the first embodiment is therefore as follows.

Following the connection of the circuit to the supply voltage, a current flows in the first and second circuit branches, depending on its polarity, and gradually charges the capacitors 2 and 4.

Figure 2:
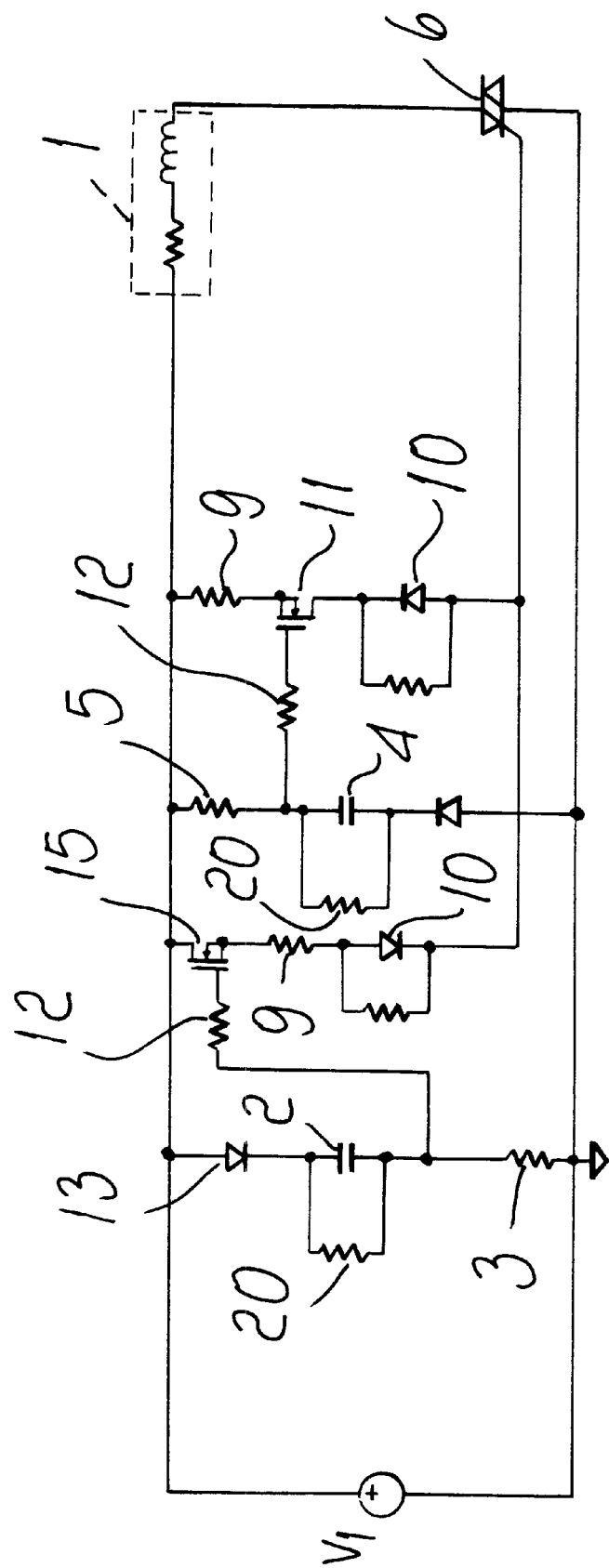
FIG. 2 is a circuit diagram of a second embodiment of the circuit according to the present invention.

A second embodiment of the circuit according to the invention is shown in FIG. 2, in which the p-channel MOS transistor of FIG. 1 is replaced with an n-channel MOS transistor 15.

Figure 3:
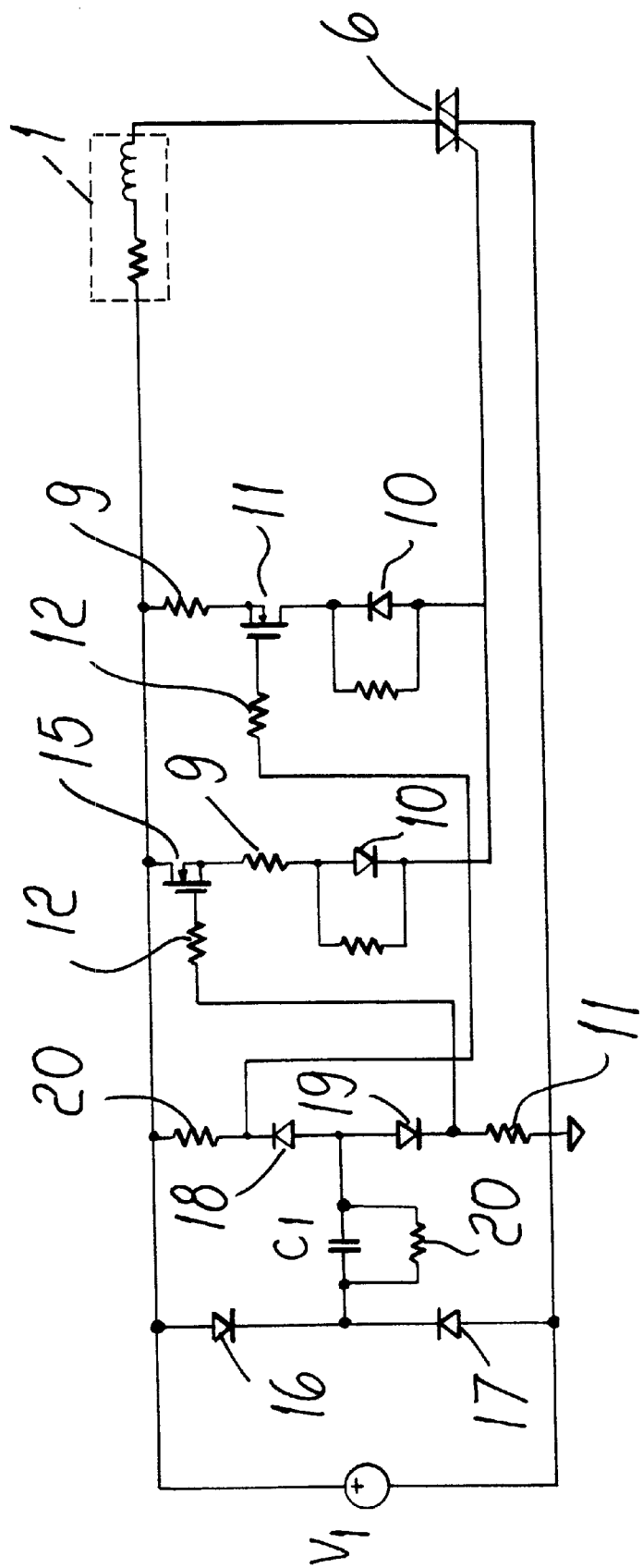
FIG. 3 is a circuit diagram of a third embodiment of the circuit according to the invention.

A third embodiment of the circuit according to the invention is shown in FIG. 3 and uses a single capacitor Cl instead of the pair of capacitors 2 and 4; capacitor C1 is inserted in a diode bridge formed by four diodes which are respectively connected in pairs so that their cathode terminals and their anode terminals are common-connected.

The diodes of the diode bridge are designated by the reference numerals 16, 17, 18 and 19.

The diodes 16 and 17 are connected so that their cathode terminals are common-connected, whereas the diodes 18 and 19 are connected so that their anode terminals are common-connected.

The cathode terminals of the diodes 18 and 19 are connected to respective resistors 20 and 21.

In this case, again as shown in FIG. 2, the amplifier means are constituted by n-channel MOS transistors. Conveniently, for discharging the capacitors 2 and 4 and for discharging the capacitor C1, in all three embodiments there are discharge resistors, designated by the reference numerals 20 respectively, which are arranged in parallel to said capacitors.

Figure 4:
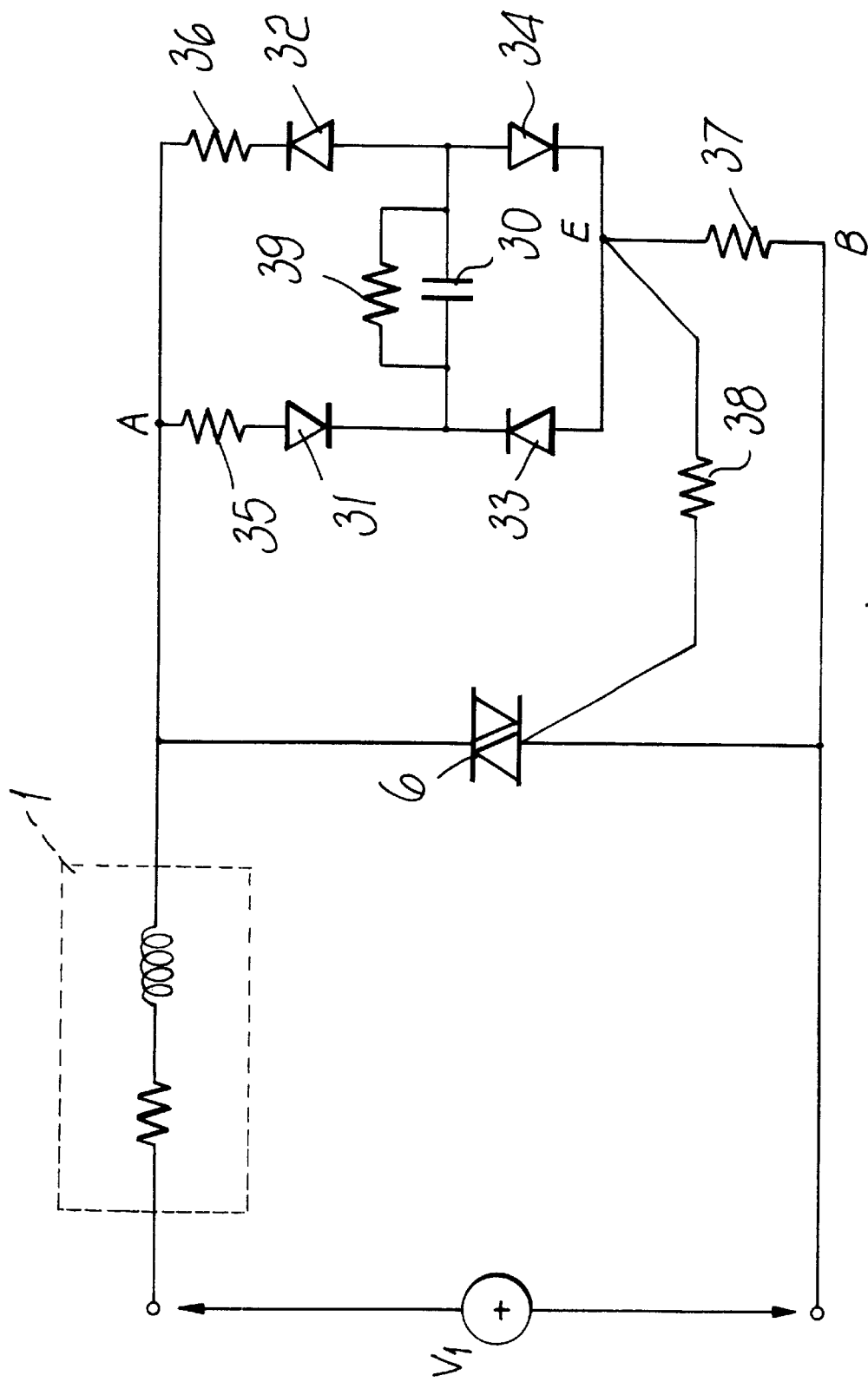
FIG. 4 is a circuit diagram of a fourth embodiment of the circuit according to the present invention.

FIG. 4 illustrates the fourth embodiment of the circuit according to the present invention, which in this case comprises the switching means 6, which are conveniently constituted by a triac and are connected in parallel to the supply voltage D1, which supplies the load 1, which is similar to the previous embodiments.

In a manner similar to the third embodiment, a single capacitor 30 is inserted in a diode bridge formed by four diodes which are respectively connected in pairs so that their cathode terminals and their anode terminals are common-connected. The diodes of the diode bridge are designated by the reference numerals 31, 32, 33 and 34.

The diodes 31 and 33 are connected so that their cathode terminals are common-connected, while the diodes 32 and 34 are connected so that their anode terminals are common-connected.

The cathode terminals of the diodes 31 and 32, respectively, are connected to resistors 35 and 36. The anode terminal of the diode 33 and the cathode terminal of the diode 34 are connected to an additional resistor 37, which is connected by means of one of its terminals to the power supply circuit, and the cathode terminal of the diode 33 and the anode terminal of the diode 34 are furthermore connected to a resistor 38 which is connected to the gate terminal of the triac 6.

A resistor 39 discharges the capacitor 30 and is therefore connected in parallel thereto.

The operation of the above described circuit is as follows.

In a first step, when voltage is applied, the triac 6 is off and all the AC mains voltage is present between the points of the circuit designated by A and B. The positive half-waves of said voltage pass into the resistor 35 and into the diode 31 which are series-connected thereto, into the capacitor 30 and into the diode 34, and arrive at the point of the circuit that is designated by E. The negative half-waves instead pass into the resistor 36, into the diode 32, into the capacitor 30 and into the diode 33 and they, too, reach the point E (the resistor 39 is very large and has no practical effect during this step of operation).

The circuit accordingly operates with both half-waves of the AC voltage.

From the point E, the positive and negative half-waves enter the gate terminal of the triac through the current divider constituted by the transistors 37 and 38 and switch on the triac, which can accordingly transfer current into the load 1.

At power-on, the voltage between the points A and B drops from the value of the mains voltage to a very small value and the flow of current in the network of diodes, resistors and capacitors is interrupted. The triac 6 conducts until the current of the load 1, which is AC, undergoes a zero crossing. At this point the triac 6 switches off automatically, and the voltage between its terminals, and therefore between the points A and B, returns to the mains voltage and the preceding step therefore reoccurs. The capacitor 30, however, is left charged by the preceding half-wave, and this residual voltage reduces the current that flows across it and reaches the point E.

At each half-wave, the capacitor 30 becomes increasingly charged and the current that arrives at the point E and then enters the gate terminal of the triac 6 becomes increasingly smaller. Current pulses in the gate terminal of the triac 6 decrease continuously until, from a certain moment onward, they are too small to switch on the triac 6, which remains off from that moment onward although a voltage is applied.

At this point the capacitor 30 remains charged at a constant value and prevents the triac 6 from switching on until all the circuit remains applied to the mains voltage. The time required to achieve power-off can be adjusted by appropriately varying the value of the capacitor C and in all the resistors.

When the mains voltage is removed, the capacitor 30 discharges through the resistor 39 in an adjustable time; when the capacitor is completely discharged, the circuit is ready to start again.

Therefore, the circuit according to the invention, in its four embodiments, allows to drive the switching means 6 with pulses which decrease over time, utilizing an AC power supply which is common to the power supply required for the asynchronous motor.

The power-on time of the motor and the reset time of the circuit are adjustable and therefore the circuit according to the present invention must supply time-decreasing voltage pulses until the capacitors of the circuit branches are fully charged. The capacitors start to discharge when voltage is removed from the circuit; the duration of this discharge determines the reset time of the circuit.

In practice it has been observed that the circuit according to the present invention fully achieves the intended aim, since its power consumption is limited to the power-on time of the motor by means of the connection with the starter circuit according to the invention. When the motor must be off, the circuit according to the invention consumes no power, accordingly achieving an energy saving with respect to conventional starter circuits.

Moreover, a single model of starter circuit can be adapted for many kinds of different compressor, at the most with the only constraint of replacing the switching means in order to adapt the circuit to the different types of compressor.

The circuit thus conceived is susceptible of numerous modifications and variations, all of which are within the scope of the inventive concept; all the details may also be replaced with other technically equivalent elements.

The disclosures in Italian Patent Application No. MI99A000804 from which this application claims priority are incorporated herein by reference.

What is claimed is:

1. A motor starter circuit for a motor of refrigerator compressors, comprising means for generating time-decreasing pulses adapted to drive switching means which are connected to a motor to be started, said means for generating time-decreasing pulses being AC-powered, wherein said means for generating time-decreasing pulses comprise a first circuit branch and a second circuit branch which are respectively constituted by a resistor and a capacitor which are mutually series-connected, each one of said first and second circuit branches driving amplifier means which are respectively connected to said switching means.

2. The circuit according to claim 1, wherein said means for generating time-decreasing pulses drive said switching means by virtue of amplifier means.

3. The circuit according to claim 1, wherein said amplifier means related to said first circuit branch comprises a p-channel MOS transistor and said amplifier means related to said second circuit branch comprises an n-channel MOS transistor.

4. The circuit according to claim 3, wherein said amplifier means further comprise a resistor and a diode which are respectively connected to said MOS transistors.

5. The circuit according to claim 1, wherein said first circuit branch and said second circuit branch respectively further comprise a diode which is series-connected to the capacitor of the corresponding branch.

6. The circuit according to claim 1, wherein said amplifier means respectively comprise an n-channel MOS transistor for said first and second circuit branches.

7. The circuit according to claim 1, wherein the capacitors of said first and second circuit branches have discharge resistors which are arranged in parallel thereto.

8. The circuit according to claim 1, wherein said switching means comprise a triac.

9. The circuit according to claim 1, wherein said switching means comprise a SCR.

10. A motor starter circuit for a motor of refrigerator compressors, comprising means for generating time-decreasing pulses adapted to drive switching means which are connected to a motor to be stated, said means for generating time-decreasing pulses being AC-powered, wherein said means for generating time-decreasing pulses comprise a diode bridge and a capacitor.

11. The circuit according to claim 10, wherein said means for generating time-decreasing pulses drive said switching means by virtue of amplifier means.

12. The circuit according to claim 10, wherein said diode bridge is respectively connected to first amplifier means and to second amplifier means which are constituted by n-channel MOS transistors which are in turn connected to said switching means.

13. The circuit according to claim 10, wherein said capacitor of the means for generating time-decreasing pulses has a discharge resistor arranged in parallel thereto.

14. The circuit according to claim 10, wherein said switching means comprise a triac.

15. The circuit according to claim 10, wherein said switching means comprise a SCR.

16. The circuit according to claim 10, wherein said diode bridge is connected to terminals of said switching means by virtue of a voltage divider.

17. The circuit according to claim 16, wherein said voltage divider comprises a first resistor which is connected between said diode bridge and said switching means, and a second resistor which is connected between said diode bridge and a supply voltage.

18. The circuit according to claim 16, wherein said capacitor comprises a discharge resistor which is connected in parallel thereto.

* * * * *